United States Patent
Lim (10) Patent No.: US 8,587,698 B2
(45) Date of Patent: Nov. 19, 2013

(54) IMAGE SENSOR AND METHOD FOR OPERATING THE SAME

(75) Inventor: Jae Hyoung Lim, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 302 days.

(21) Appl. No.: 13/159,503

(22) Filed: Jun. 14, 2011

(65) Prior Publication Data

US 2011/0317036 A1 Dec. 29, 2011

(30) Foreign Application Priority Data

Jun. 25, 2010 (KR) .................... 10-2010-0060542

(51) Int. Cl.
*H04N 5/217* (2011.01)
*H04N 3/14* (2006.01)
*H04N 5/335* (2011.01)
*H03M 3/00* (2006.01)
*H03M 1/00* (2006.01)
*H01L 27/00* (2006.01)
*H01L 31/062* (2012.01)
*H01L 31/113* (2006.01)

(52) U.S. Cl.
USPC .......... 348/241; 348/300; 341/143; 341/122; 250/208.1; 257/291

(58) Field of Classification Search
USPC .......... 348/241, 300–302; 341/122–125, 143; 250/208.1; 257/291–294
See application file for complete search history.

(56) References Cited

U.S. PATENT DOCUMENTS

| | | | |
|---|---|---|---|
| 5,736,886 A * | 4/1998 | Mangelsdorf et al. ........ | 327/310 |
| 6,683,554 B2 * | 1/2004 | Nikai et al. ................... | 341/161 |
| 7,068,198 B2 * | 6/2006 | Hong et al. .................... | 341/143 |
| 7,145,494 B2 * | 12/2006 | Mizuguchi et al. ........... | 341/155 |
| 7,295,143 B2 * | 11/2007 | Ambo et al. ................... | 341/172 |
| 7,863,953 B2 * | 1/2011 | Li ................................. | 327/156 |
| 7,907,076 B2 * | 3/2011 | Yoshida et al. ............... | 341/158 |
| 7,999,865 B2 * | 8/2011 | Fowler .......................... | 348/243 |
| 8,125,550 B2 * | 2/2012 | Su et al. ........................ | 348/294 |
| 8,179,455 B2 * | 5/2012 | Leung et al. .................. | 348/241 |
| 2003/0001075 A1 * | 1/2003 | Mukherjee et al. ......... | 250/208.1 |
| 2004/0169555 A1 * | 9/2004 | Confalonieri et al. ........ | 330/69 |
| 2005/0040886 A1 * | 2/2005 | Fujimoto ........................ | 330/9 |

(Continued)

FOREIGN PATENT DOCUMENTS

| | | |
|---|---|---|
| JP | 2006-020171 A | 1/2006 |
| KR | 1020060022804 A | 3/2006 |
| KR | 1020070028210 A | 3/2007 |
| KR | 10-2007-0079857 A | 8/2007 |

*Primary Examiner* — Chia-Wei A Chen
(74) *Attorney, Agent, or Firm* — William Park & Associates Patent Ltd.

(57) ABSTRACT

An image sensor is provided. A first storage unit stores an image information value corresponding to an image signal provided from a pixel, and a second storage unit stores a reset information value corresponding to a reset signal provided from the pixel. A differential signal comparison unit receives image information value and the reset information value, compares the two values, and outputs a difference value therebetween. A switch unit is switched so that the two input values are transferred in a crossed manner in a first operation period and a second operation period. A digital value providing unit combines a first digital value, which corresponds to an output timing of a first comparison signal in the first operation period, and a second digital value, which corresponds to an output timing of a second comparison signal in the second operation period, and output a digital value corresponding to image information received at the pixel.

18 Claims, 10 Drawing Sheets

(56) References Cited

U.S. PATENT DOCUMENTS

| | | | |
|---|---|---|---|
| 2006/0170795 A1* | 8/2006 | Higuchi et al. | 348/241 |
| 2006/0267823 A1* | 11/2006 | Pinna et al. | 341/143 |
| 2007/0007347 A1* | 1/2007 | Yahagi et al. | 235/454 |
| 2007/0030190 A1* | 2/2007 | Lee | 341/155 |
| 2009/0213259 A1* | 8/2009 | Su et al. | 348/308 |
| 2010/0073537 A1* | 3/2010 | Kato et al. | 348/300 |
| 2010/0097501 A1* | 4/2010 | Fowler | 348/241 |
| 2010/0103015 A1* | 4/2010 | Yoshida et al. | 341/143 |
| 2010/0108862 A1* | 5/2010 | Mizoguchi et al. | 250/214 A |
| 2010/0259430 A1* | 10/2010 | Okamoto et al. | 341/122 |
| 2010/0301917 A1* | 12/2010 | Yoshimura et al. | 327/333 |
| 2011/0260039 A1* | 10/2011 | Fowler | 250/208.1 |
| 2011/0278437 A1* | 11/2011 | Takiba | 250/214 A |
| 2012/0268727 A1* | 10/2012 | Schrey et al. | 356/5.01 |

* cited by examiner

IMAGE SENSOR AND METHOD FOR OPERATING THE SAME

CROSS-REFERENCE(S) TO RELATED APPLICATIONS

The present application claims priority of Korean Patent Application No. 10-2010-0060542, filed on Jun. 25, 2010, which is incorporated herein by reference in its entirety.

BACKGROUND OF THE INVENTION

Exemplary embodiments of the present invention relate to a semiconductor integrated circuit, and more particularly, to an image sensor.

An image sensor refers to a device which captures an image by using semiconductor properties that respond to light. A charge coupled device (CCD) image sensor has been widely used. As the complementary-metal-oxide-semiconductor (CMOS) technology has rapidly advanced, a CMOS image sensor has been developed. As opposed to a CCD image sensor, a CMOS image sensor has an advantage in that an analog control circuit including a pixel array and a digital control circuit can be directly implemented on a single integrated circuit.

A CMOS image sensor includes a pixel array including a plurality of pixels typically configured in a matrix form. In addition, the CMOS image sensor includes a plurality of analog-to-digital conversion (ADC) units which receive analog information from each column of the pixel array and convert the received analog information into digital values. The CMOS image sensor can reproduce a realistic image when the digital values provided from the ADC units exactly correspond to analog signals provided from pixels. However, due to an offset component generated by inherent characteristics of an integrated circuit, it is difficult to reproduce an image exactly corresponding to image information inputted to the pixel arrays.

SUMMARY OF THE INVENTION

An embodiment of the present invention is directed to an image sensor having improved offset characteristic.

In accordance with an embodiment of the present invention, an image sensor includes: a first storage unit configured to store an image information value corresponding to an image signal provided from a pixel; a second storage unit configured to store a reset information value corresponding to a reset signal provided from the pixel; a differential signal comparison unit configured to compare the image information and the reset information; a switch unit configured to transfer the image information and the reset information to a first input terminal and a second input terminal, respectively, of the differential signal comparison unit during a first operation period, and to transfer the image information value and the reset information value to the second input terminal and the first input terminal, respectively, during a second operation period; wherein the switch unit is switched so that the two input values are transferred in a crossed manner during a first operation period and a second operation period; and a digital value providing unit configured to combine a first digital value, which corresponds to an output timing of a first comparison signal provided from the first output terminal of the differential signal comparison unit in the first operation period, and a second digital value, which corresponds to an output timing of a second comparison signal provided from the second output terminal of the differential signal comparison unit in the second operation period, and output a digital value corresponding to image information received at the pixel.

In accordance with another embodiment of the present invention, an image sensor includes a first storage unit configured to store a first image signal and a second image signal sequentially provided from a pixel; a second storage unit configured to store a first reset signal and a second reset signal sequentially provided from the pixel and corresponding to the first image signal and the second image signal; a differential signal comparison unit configured to compare input signals through a first input terminal and a second input terminal, and output an output signal corresponding to a difference value of the input signals through a first output terminal or a second output terminal; a first switch unit configured to be switched to transfer a first image information value and a first reset information value to the first input terminal and the second input terminal of the differential signal comparison unit, respectively, and transfer a second information value and a second reset information value to the second input terminal and the first input terminal of the differential signal comparison unit, respectively; a second switch unit configured to be switched to sequentially transfer a first comparison signal provided from the first output terminal of the differential signal comparison unit, and a second comparison signal provided from the second output terminal of the differential signal comparison unit; and a digital value providing unit configured to transfer a first digital value corresponding to an output timing of the first comparison signal, and a second digital value corresponding to an output timing of the second comparison signal.

In accordance with another embodiment of the present invention, a method for generating an image includes: storing an image signal value corresponding to an image signal provided from a pixel; storing a reset signal value corresponding to a reset signal provided from the pixel; receiving the image signal value and the reset signal value through a first input terminal and a second input terminal of a differential signal comparison unit, respectively, comparing the image signal value with the reset signal value, and outputting a first comparison signal through a first output terminal of the differential signal comparison unit; starting a counting operation at a timing when the comparison is started, and outputting a count value, which is counted until the first comparison signal is generated, as a first digital value; receiving the image signal value and the reset signal value through the second input terminal and the first input terminal of the differential signal comparison unit, respectively, comparing the image signal value with the reset signal value, and outputting a second comparison signal through a second output terminal of the differential signal comparison unit; starting a counting operation at a timing when the comparison is started, and outputting a count value, which is counted until the second comparison signal is generated, as a second digital value; and combining the first digital value and the second digital value, and output a digital value.

In accordance with another embodiment of the present invention, a method for generating an image includes: storing a first image signal value corresponding to a first image signal provided from a pixel; storing a first reset signal value corresponding to a first reset signal provided from the pixel; receiving the first image signal value and the first reset signal value through a first input terminal and a second input terminal of a differential signal comparison unit, respectively, comparing the first image signal value with the second reset signal value, and outputting a first comparison signal through a first output terminal of the differential signal comparison unit; starting a counting operation at a timing when the comparison is started, and outputting a count value, which is counted until the first comparison signal is generated, as a first digital value; storing a second image signal value corresponding to a second image signal provided from a pixel; storing a second reset signal value corresponding to a second reset signal provided from the pixel; receiving the second image signal value and the second reset signal value through the second input terminal and the first input terminal of the differential signal comparison unit, respectively, comparing the second image signal value with the second reset signal value, and outputting a second comparison signal through a second output terminal of the differential signal comparison unit; starting a counting operation at a timing when the comparison is started, and outputting a count value, which is counted until the second comparison signal is generated, as a second digital value; and combining the first digital value and the second digital value, and output a digital value.

DESCRIPTION OF SPECIFIC EMBODIMENTS

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

A CMOS image sensor in accordance with an embodiment of the present invention can remove an offset of a column ADC unit provided for a correlated double sampling (CDS) operation. To this end, the column ADC unit includes a differential signal comparison unit configured to receive a differential signal, and a digital value providing unit configured to store and output a digital value corresponding to a signal provided from the differential signal comparison unit.

Figure 1:
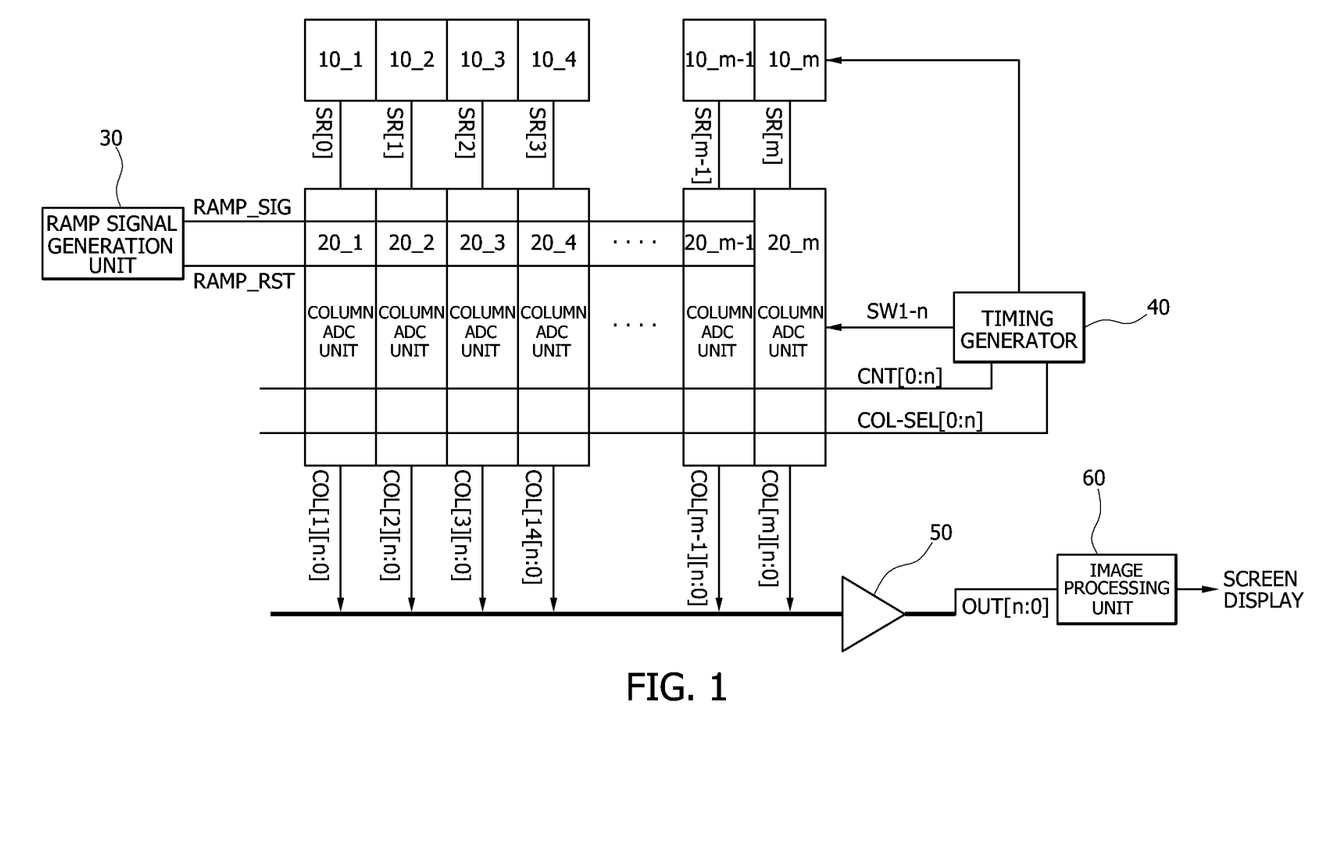
FIG. 1 is a block diagram of a CMOS image sensor, which is presented for explaining the present invention.

FIG. 1 is a block diagram of a CMOS image sensor, which is presented for explaining the present invention.

Referring to FIG. 1, the CMOS image sensor includes a plurality of pixel arrays 10_1 to 10_m, a plurality of column ADC units 20_1 to 20_m, a ramp signal generation unit 30, a timing generator 40, a buffer unit 50, and an image processing unit 60. Each of the pixel arrays 10_1 to 10_m includes a plurality of pixels. For example, each of the pixel arrays 10_1 to 10_m includes a single column of pixels. Accordingly, the pixel arrays 10_1 to 10_m comprise a matrix of pixels. The plurality of column ADC units 20_1 to 20_m receives signals from the corresponding pixel arrays 10_1 to 10_m and output corresponding digital values.

The ramp signal generation unit 30 generates a first ramp signal RAMP_SIG and a second ramp signal RAMP_RST, and provides the first ramp signal RAMP_SIG and the second ramp signal RAMP_RST to the plurality of column ADC units 20_1 to 20_m. The CMOS image sensor performs a CDS operation to extract image signal components from the signals provided from the pixels. The CDS operation is an operation which sequentially provides a signal outputted when a pixel is reset, and a signal corresponding to an input image, and processes a difference of the two signals into an image value in an accompanied circuit. The first ramp signal RAMP_SIG and the second ramp signal RAMP_RST are provided to the column ADC unit, which extracts the difference between the two signals. The levels of the first ramp signal RAMP_SIG and the second ramp signal RAMP_RST decrease at a preset rate.

The timing generator 40 receives a preset value or a user input value, and generates signals necessary for an internal operation timing of the CMOS image sensor. It is illustrated in FIG. 1 that the timing generator 40 provides a plurality of switching control signals (for example, SW1-n) necessary for the internal operations of the pixel arrays 10_1 to 10_m and the column ADC units 20_1 to 20_m. Some other signals generated by the timing generator 40 are a count value CNT[0:n] and a column selection signal COL_SEL[1:0] to the column ADC units 20_1 to 20_m. The count value CNT[0:n] and the column selection signal COL_SEL[1:0] may also be provided to other circuit blocks.

Figure 2:
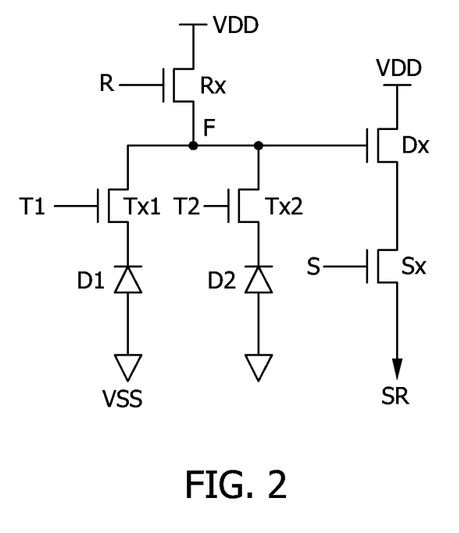
FIG. 2 is a circuit diagram of pixels provided in a pixel array unit illustrated in FIG. 1 in accordance with an embodiment of the present invention.

FIG. 2 is a circuit diagram of the pixels provided in the pixel array unit illustrated in FIG. 1 in accordance with an embodiment of the present invention. The pixels illustrated in FIG. 1 are configured so that two pixels share three MOS transistors.

Figure 3:
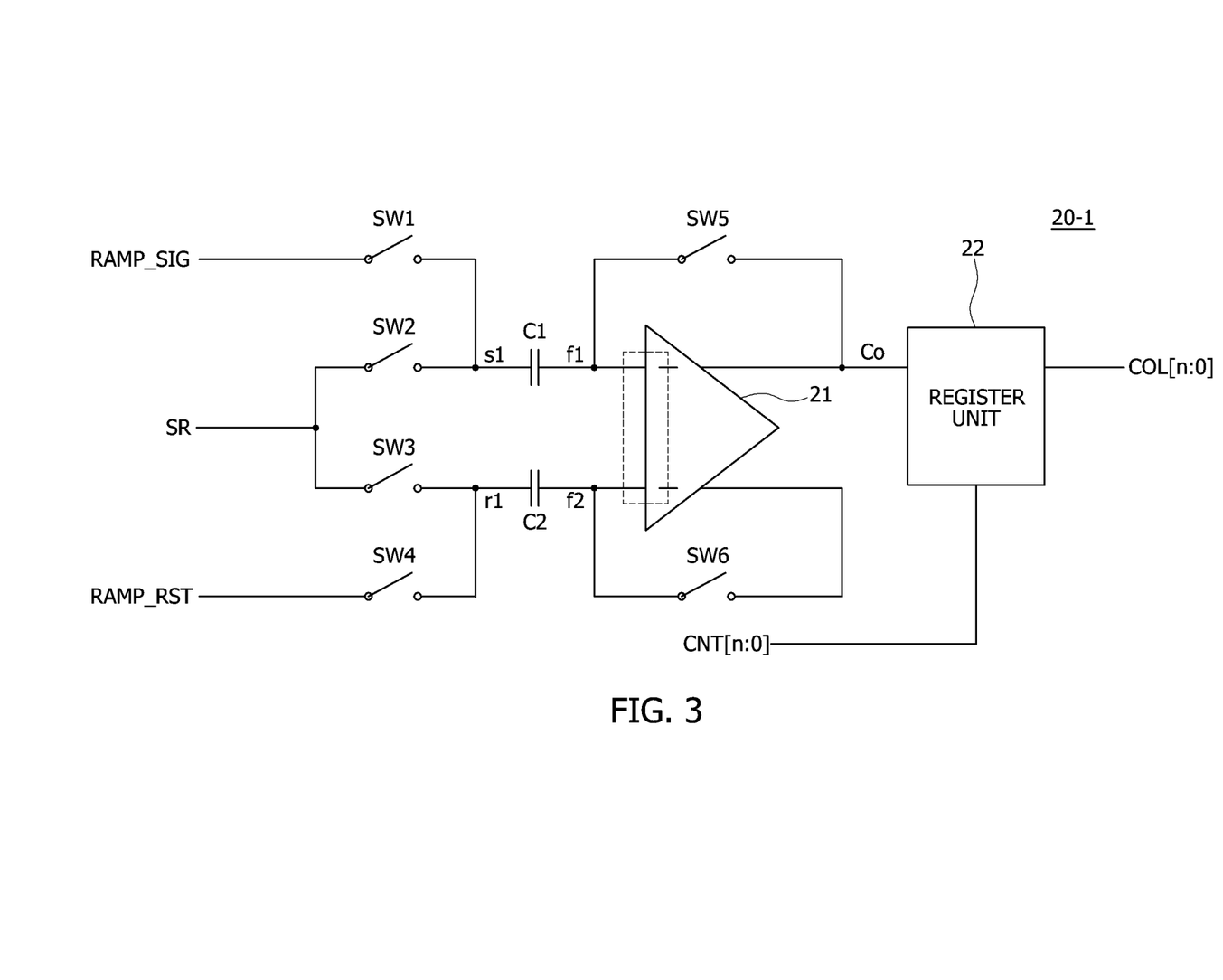
FIG. 3 is a circuit diagram of a column ADC unit illustrated in FIG. 1.

Referring to FIG. 3, the pixels include photodiodes D1 and D2, transfer transistors Tx1 and Tx2, a reset transistor Rx, a drive transistor Dx, and a select transistor Sx. The photodiodes D1 and D2 accumulate charges corresponding to external incident light. The transfer transistors Tx1 and Tx2 transfer the charges accumulated in the photodiodes D1 and D2 to a floating node F. The drive transistor Dx drives a signal corresponding to the charges accumulated in the floating node F through. The select transistor Sx outputs a signal provided by the drive transistor Dx to the column ADC units. The reset transistor Rx resets the floating node F.

When the reset transistor Rx is turned on, the floating node F becomes a reset level, and a signal corresponding to reset is transferred to the column ADC unit through a pixel signal transfer node SR by the drive transistor Dx and the select transistor Sx. When the reset transistor Rx is turned off and the transfer transistor T1 or T2 is turned on, the charges accumulated in the photodiodes D1 or D2 are transferred to the floating node F. An image signal corresponding to the charges accumulated in the floating node F is transferred through the pixel signal transfer node SR to the column ADC unit by the drive transistor Dx and the select transistor Sx.

For reference, a single pixel of a traditional CMOS image sensor includes four transistors. In recent years, however, the reset transistor Rx, the drive transistor Dx, and the select transistor Sx have been shared by two pixels, as illustrated in FIG. 2. In this manner, the integration density of the pixel region can be improved.

Figure 4:
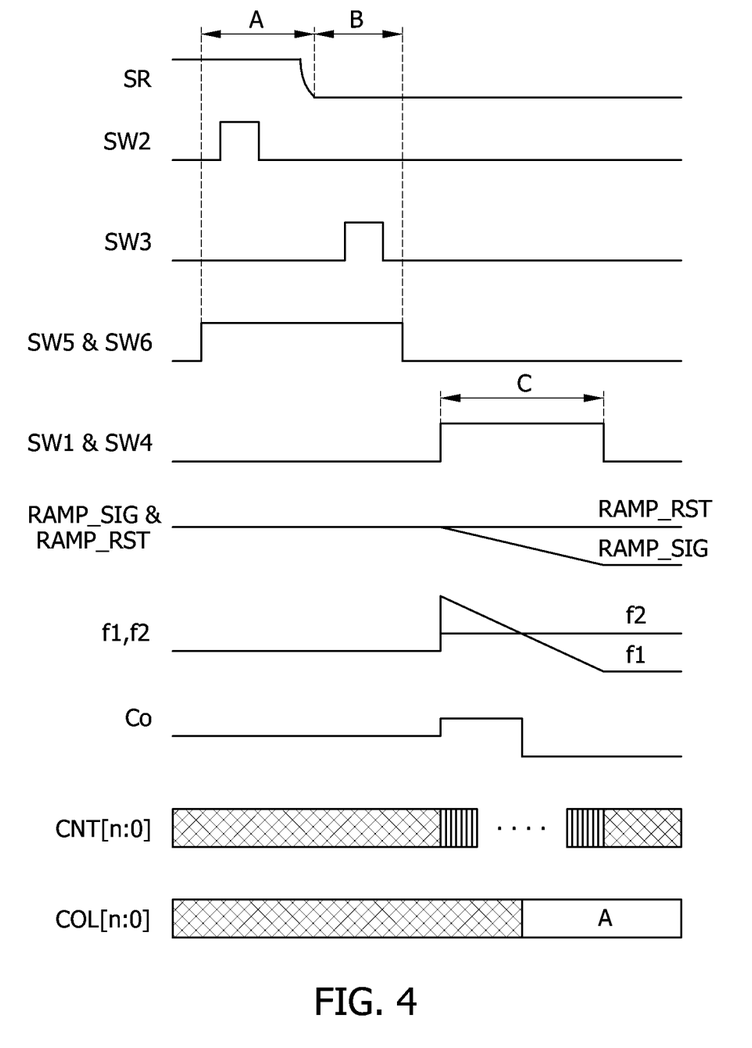
FIG. 4 is a waveform diagram explaining the operation of the ADC unit illustrated in FIG. 2.

FIG. 3 is a circuit diagram of the column ADC unit illustrated in FIG. 1. FIG. 4 is a waveform diagram explaining the operation of the ADC unit illustrated in FIG. 2.

Referring to FIG. 3, the column ADC unit includes two capacitors C1 and C2, a differential signal comparison unit 21, a register unit 22, and switches SW1 to SW6. The capacitor C1 stores an image signal. When the switch SW2 is turned on, the capacitor C1 receives the image signal of the pixel through the pixel signal transfer node SR and stores corresponding charges. When the switch SW3 is turned on, the capacitor C2 receives a reset signal from the pixel through the pixel signal transfer node SR and stores corresponding charges.

The differential signal comparison unit 21 outputs a signal Co corresponding to a difference of input signals provided from the two capacitors C1 and C2. The register unit 22 stores and outputs a digital value COL[n:0] corresponding to the signal Co provided from the differential signal comparison unit 21. The differential signal comparison unit 21 is configured with a circuit which can provide an output value corresponding to a difference between the two input signals. The differential signal comparison unit 21 may be, for example, a differential amplifier such as an operational amplifier.

The operation of the column ADC circuit will be described below with reference to FIGS. 3 and 4. The switches SW5 and SW6 are turned on in order to calibrate two input terminals f1 and f2 of the differential signal comparison unit 21 to a reference level. During this period, an offset is removed by the internal structure of the differential signal comparison unit 21. In addition, during periods A and B where the switches SW5 and SW6 are turned on, the image signal and the reset signal provided from the pixel are stored in the capacitors C1 and C2.

The image signal is provided from the pixel through the pixel signal transfer node SR during the first period A, and the reset signal is provided from the pixel through the pixel signal transfer node SR during the second period B. When the switch SW2 is turned on, charges corresponding to the image signal are stored in the capacitor C1 through the pixel signal transfer node SR. Then, when the switch SW3 is turned on, charges corresponding to the reset signal are stored in the capacitor C2 through the pixel signal transfer node SR.

Next, the switches SW5 and SW6 are turned off, and the switches SW1 and SW4 are turned on. A third period C in which the switches SW1 and SW4 are turned on is a period where the column ADC unit calculates a digital value corresponding to a difference between the image signal and the reset signal provided from the pixel and outputs the calculated digital value. When the third period C begins, that is, the switches SW1 and SW4 are turned on, the first ramp signal RAMP_SIG and the second ramp signal RAMP_RST have preset voltage levels. Thus, the levels of the nodes f1 and f2 are increased to preset voltage levels. That is, the level of the node f1 is increased by the voltage level corresponding to the image signal stored in the capacitor C1 in the first period A and the voltage level corresponding to the level of the first ramp signal RAMP_SIG. The voltage level of the node f2 is increased by the voltage level corresponding to the image signal stored in the capacitor C2 in the second period B and the voltage level corresponding to the level of the second ramp signal RAMP_RST. The second ramp signal RAMP_RST is continuously maintained at the same level, and the first ramp signal RAMP_SIG is gradually decreased at a preset rate. Thus, the signal level of the node f2 is maintained at a constant level, and the signal level of the node f1 is gradually lowered.

Meanwhile, after the third period C begins, the differential signal comparison unit 21 receives the first ramp signal RAMP_SIG, the second ramp signal RAMP_RST, and outputs the comparison signal Co corresponding to the voltage difference between the nodes f1 and f2, which are generated by the image signal and the reset signal. The comparison signal Co maintains a high level when there is the voltage difference between the nodes f1 and f2, and outputs a low level when there is no voltage difference between the nodes f1 and f2. When the levels of the nodes f1 and f2 are lowered and the voltage difference between the nodes f1 and f2 disappears, the comparison signal Co changes from a high level to a low level.

The register unit 22 receives the count value CNT[n:0] counted after start of the third period C, stores the count value CNT[n:0] at the moment when the comparison signal Co becomes a low level, and outputs a digital value COL[n:0] corresponding to the count value CNT[n:0]. The outputted digital value COL[n:0] is transferred through the buffer unit 50 and the image processing unit 60 and is used to generate an image.

As described above, a final digital value COL[n:0] is generated using the image information inputted to the pixel. In order to generate the exact digital value COL[n:0] corresponding to the image information inputted to the pixel, the differential signal comparison unit 21 should be able to exactly compare the differential signals. Accordingly, the two capacitors C1 and C2 need to have substantially equal characteristics. However, due to characteristics of the fabrication process of a semiconductor integrated circuit, it is not easy to form two capacitors C1 and C2 having perfectly equal characteristics. In addition, due to characteristics of the fabrication process, it is not easy to fabricate the differential signal comparison unit 21 that can exactly compare the differential signals. Consequently, due to offsets of each circuit block disposed inside the column ADC unit, it is difficult to generate an exact digital value corresponding to the signal provided from the pixel.

Figure 5:
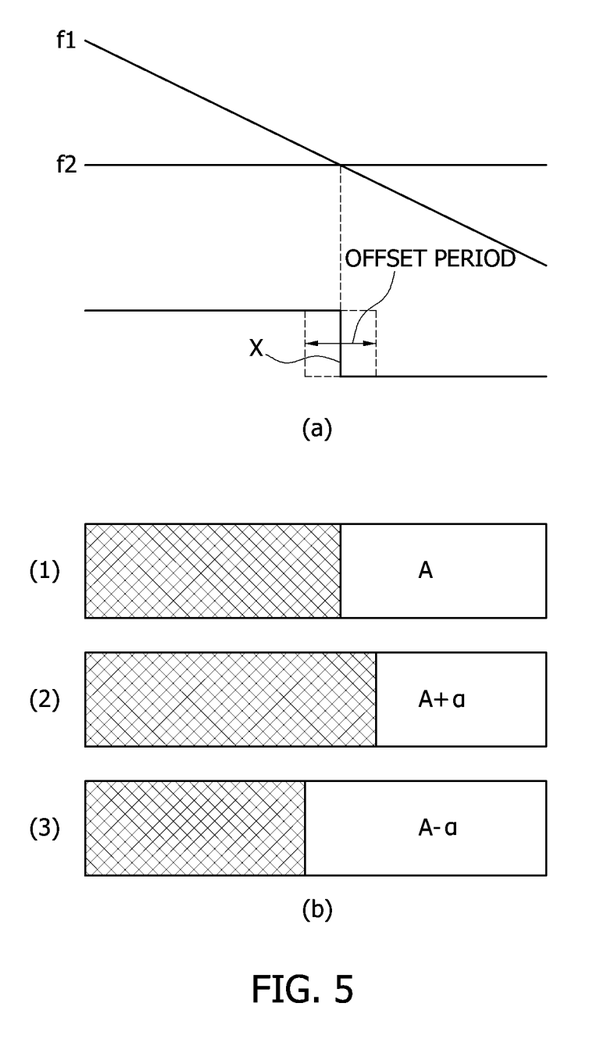
FIGS. 5 and 6 are waveform diagrams explaining problems of the column ADC unit illustrated in FIG. 3.
Figure 6:
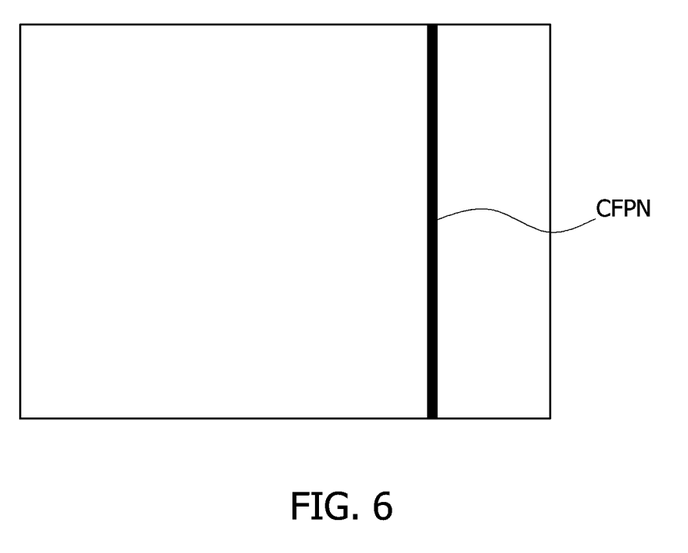

FIGS. 5 and 6 are waveform diagrams explaining problems of the column ADC unit illustrated in FIG. 3.

As illustrated in FIG. 5, due to an offset of the column ADC unit, rather than a digital value A corresponding to a preset position (see X) being stored, another value A+a or A−a may be stored. As illustrated in FIG. 6, the above-described offset appears as a column fixed pattern node (CFPN) when an image is reproduced.

Upon operation, the differential signal comparison unit 21 automatically cancel an offset component to some degree by an auto zero scheme. However, due to a limit to an implementation area of the CMOS image sensor, the CMOS image sensor cannot be implemented in a large enough circuit area so that the differential signal comparison unit 21 can sufficiently cancel the offset. In addition, it may be impossible to completely cancel an offset component due to mismatch of the capacitors C1 and C2 or mismatch of other circuits. In addition, since the above-described offset component has a different value at each column, it may appear as a CFPN.

To solve the above-described problems, the present invention proposes a CMOS image sensor including a column ADC unit from which an offset is cancelled. The CMOS image sensor further includes a switch unit which can switch a signal inputted to a differential signal comparison unit provided in the column ADC unit, and cancels an offset by generating a positive offset and a negative offset using a two-time image signal processing and then adding the two offsets.

Figure 7:
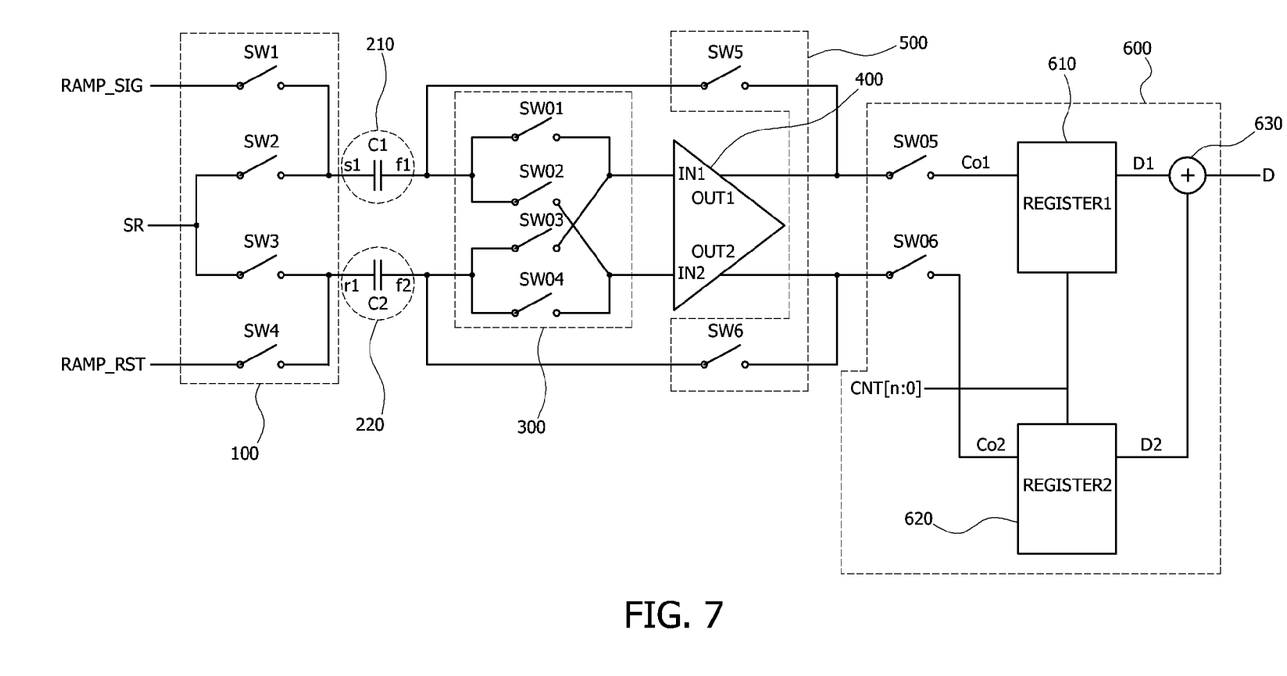
FIG. 7 is a circuit diagram of a column ADC unit in accordance with a first embodiment of the present invention.

FIG. 7 is a circuit diagram of a column ADC unit in accordance with a first embodiment of the present invention.

Referring to FIG. 7, the column ADC unit of the CMOS image sensor in accordance with the embodiment of the present invention includes a first switch unit 100, a first storage unit 210, a second storage unit 220, a second switch unit 300, a differential signal comparison unit 400, a third switch unit 500, and a digital value providing unit 600.

A pixel (see FIG. 2) provides a reset signal and an image signal corresponding to image information received from the outside. The reset signal and the image signal are transferred through a pixel signal transfer node SR. The first storage unit 210 includes a capacitor C1 and stores image information corresponding to the image signal provided from the pixel. The second storage unit 220 includes a capacitor C2 and stores reset information corresponding to the reset signal provided from the pixel.

The first switch unit 100 includes a first switch SW1, a second switch SW2, a third switch SW3, and a fourth switch SW4. The second switch SW2 transfers the image signal to the capacitor C1, and the third switch SW3 transfers the reset signal to the capacitor C2. The first switch SW1 transfers a first ramp signal RAMP_SIG to a second terminal of the capacitor C1 in order to raise a level of a first terminal f1 of the capacitor C1 to a preset level. The fourth switch SW4 transfers a second ramp signal RAMP_SIG to a second terminal of the capacitor C2 in order to raise a level of a first terminal of the capacitor C2 to a preset level.

The second switch unit 300 transfers the image information and the reset information to a noninverting input terminal IN1 and an inverting input terminal IN2. Specifically, the second switch unit 300 is configured so that the two input values are transferred in a first operation period and a second operation period. The second switch unit 300 includes a switch SW01, a switch SW02, a switch SW03, and a switch SW04. The switch SW01 transfers the image information stored in the first storage unit 210 to a noninverting input terminal IN1 of the differential signal comparison unit 400. The switch SW03 transfers the reset information stored in the second storage unit 220 to the noninverting input terminal IN1 of the differential signal comparison unit 400. The switch SW02 transfers the image information stored in the first storage unit 210 to an inverting input terminal IN2 of the differential signal comparison unit 400. The fourth switch SW04 transfers the reset information stored in the second storage unit 220 to the inverting input terminal IN2 of the differential signal comparison unit 400.

The differential signal comparison unit 400 receives one of the image information and the reset information through the noninverting input terminal IN1 and receives the other through the inverting input terminal IN2, compares the image information with the reset information, and outputs a comparison signal corresponding to the difference between the image information and the reset information to a first output terminal OUT1, which may be a noninverting output terminal, or a second output terminal OUT2, which may be an inverting output terminal. The third switch 500 includes a switch SW5 and a switch SW6. The switch SW5 selectively connects a first terminal f1 of the capacitor C1 to the noninverting output terminal OUT1 of the differential signal comparison unit 400. The switch SW6 selectively connects a first terminal f2 of the capacitor C2 to the inverting output terminal OUT2 of the differential signal comparison unit 400.

The digital value providing unit 600 outputs a mean of a first digital value D1 and a second digital value D2 as a digital value D corresponding to image information received at the pixel. The first digital value D1 is a value corresponding to an output timing of a first comparison signal Co1 provided from the noninverting output terminal OUT1 of the differential signal comparison unit 400 in the first operation period, and the second digital value D2 is a value corresponding to an output timing of a second comparison signal Co2 provided from the inverting output terminal OUT2 of the differential signal comparison unit 400. The first operation period and the second operation period are illustrated in FIG. 8, and a detailed related operation thereof will be described later with reference to FIG. 8.

During the first operation period, the digital value providing unit 600 receives the count value CNT[0:n] counted when the differential signal comparison unit 400 starts the comparison operation, and outputs, as the digital value D1, the count value counted until the first comparison signal Co1 provided from the noninverting output terminal OUT1 of the differential signal comparison unit 400 is generated. In addition, during the second operation period, the digital value providing unit 600 receives the count value CNT[0:n] counted when the differential signal comparison unit 400 starts the comparison operation, and outputs, as the digital value D2, the count value counted until the second comparison signal Co2 provided from the inverting output terminal OUT2 of the differential signal comparison unit 400 is generated.

The digital value providing unit 600 includes a switch SW05, a switch SW06, a first register unit 610, a second register unit 620, and a signal output unit 630. The switch SW05 transfers the first comparison signal Co1 outputted from the noninverting output terminal OUT1 of the differential signal comparison unit 400. The switch SW06 transfers the second comparison signal outputted from the inverting output terminal OUT2 of the differential signal comparison unit 400. The first register unit 610 stores the first digital value D1 in response to the first comparison signal Co1 provided by the switch SW05 during the first operation period. The second register unit 620 stores the second digital value D2 in response to the second comparison signal Co2 provided by the switch SW06 during the second operation period. The signal output unit 630 generates the mean value of the first and second digital values D1 and D2. Alternatively, instead of generating the mean value of the first and second digital values D1 and D2, the signal output unit 630 may output the sum of the two digital values D1 and D2, and another circuit may be generated the mean value of the two digital values D1 and D2.

Figure 8:
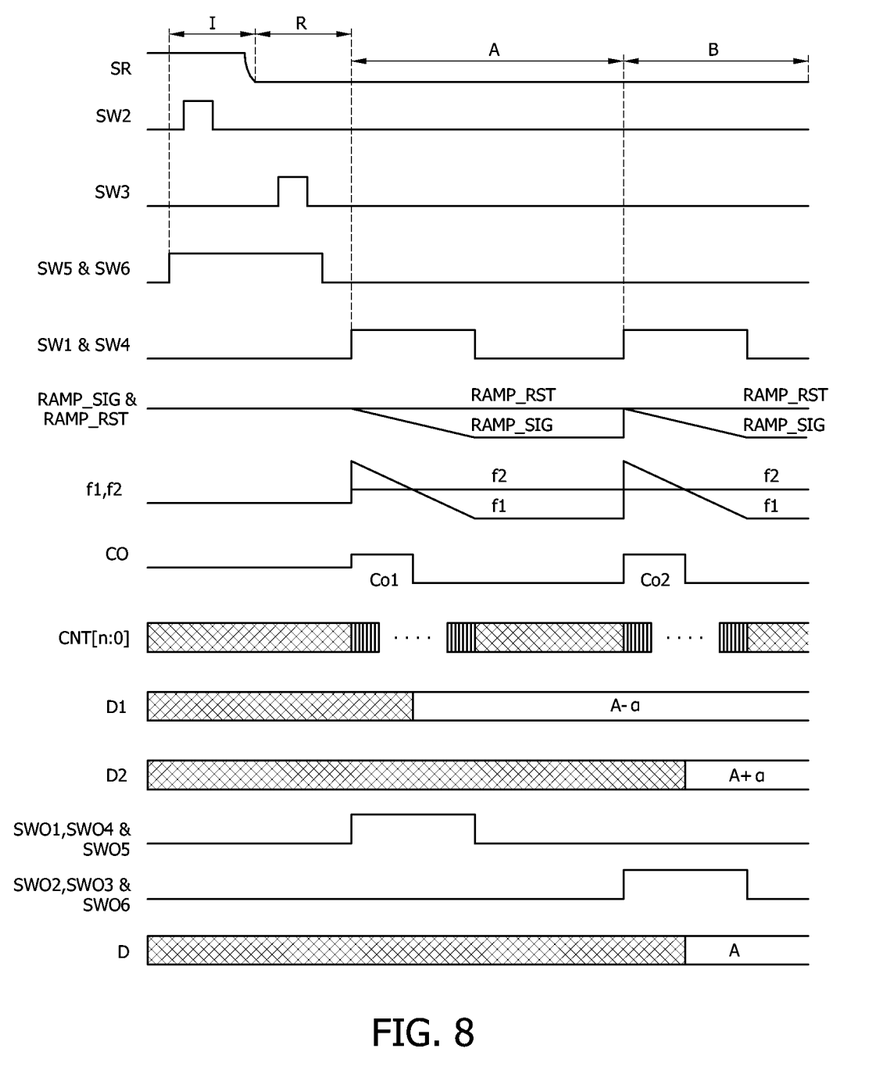
FIG. 8 is a waveform diagram explaining the operation of the column ADC unit illustrated in FIG. 7.

FIG. 8 is a waveform diagram explaining the operation of the column ADC unit illustrated in FIG. 7. The operation of the CMOS image sensor in accordance with the embodiment of the present invention will be described below with reference to FIGS. 7 and 8.

First, the pixel (see FIG. 2) provides the reset signal (see the period R) and the image signal (see the period I) through the pixel signal transfer node SR. In this period, the switches SW5 and SW6 are turned on, so that the nodes f1 and f2 of the two capacitors C1 and C2 are maintained at a preset level. When the switch SW2 is turned on in the period I, charges corresponding to the image signal are stored in the capacitor C1. When the switch SW3 is turned on in the period R, charges corresponding to the reset signal are stored in the capacitor C2.

Then, the switches SW5 and SW6 are turned off, and the switches SW1 and SW4 are turned on. Therefore, the first ramp signal RAMP_SIG is applied to the terminal s1 of the capacitor, and the second ramp signal RAMP_RST is applied to the terminal r1 of the capacitor C2. Since the first ramp signal RAMP_SIG and the second ramp signal RAMP_RST have preset levels, the level of the terminal f1 of the capacitor C1 is raised by the sum of the levels of the image signal and the first ramp signal RAMP_SIG. In addition, the level of the terminal f2 of the capacitor C2 is raised by the sum of the levels of the reset signal and the second ramp signal RAMP_RST.

In the first operation period (see the period A), the switches SW01 and SW04 are turned on, so that the voltage stored in the capacitor C1 is transferred to the noninverting input terminal IN1 of the differential signal comparison unit 400 and the voltage stored in the capacitor C2 is transferred to the inverting input terminal IN2 of the differential signal comparison unit 400. In addition, in the first operation period (see the period A), the switch SW05 is turned on, so that the first comparison signal Co1 outputted through the noninverting output terminal OUT1 of the differential signal comparison unit 400 is transferred to the first register unit 610.

The first ramp signal RAMP_SIG is a signal which decreases at a constant rate and the second ramp signal RAMP_RST is a signal which maintains a constant level. Thus, as illustrated in FIG. 8, as time passes by, the level of the node f1 of the capacitor C1 is gradually lowered, and the node f2 of the capacitor C2 maintains a constant level. The differential signal comparison unit 400 outputs the first comparison signal Co1 having a high level through the noninverting output terminal OUT1 when the switches SW01 and SW04 are turned on and the signal level of the node f1 is greater than the signal level of the node f2 change, and outputs the first comparison signal Co1 having a low level when the signal level of the node f1 is less than or equal to the signal level of the node f2.

The first register unit 610 receives the count signal CNT[n:0] counted during a time when the differential signal comparison unit 400 outputs the first comparison signal Co1 having a high level, stores the count signal CNT[n:0] counted when the first comparison signal Co1 becomes a low level, and outputs the first digital value D1. Then, the switches SW1, SW4, SW01, SW04, and SW05 are turned off.

In the second operation period, the switches SW1, SW4, SW02, SW03, and SW06 are turned off. Therefore, the terminal f1 of the capacitor C1 is raised by the sum of the levels of the image signal and the first ramp signal RAMP_SIG, and the terminal f2 of the capacitor C2 is raised by the sum of the levels of the reset signal and the second ramp signal RAMP_RST. Then, due to the turned-on switches SW02 and SW03, the terminal f1 of the capacitor C1 is connected to the inverting input terminal IN2 of the differential signal comparison unit 400, and the terminal f2 of the capacitor C2 is connected to the noninverting input terminal IN1 of the differential signal comparison unit 400.

As described above, since the first ramp signal RAMP_SIG is a signal which decreases at a constant rate, the level of the terminal f1 of the capacitor C1 is gradually lowered and the terminal f2 of the capacitor C2 maintains a constant level, as the time passes by. Since the switches SW02 and SW03 are in a turned-on state, the differential signal comparison unit 400 outputs the second comparison signal Co2 having a high level through the inverting output terminal OUT1 when the signal level at the node f1 is greater than the signal level at the node f2, and outputs the second comparison signal Co2 having a low level when the signal level of the node f1 is equal to or less than the signal level at the node f2.

The second register unit 620 receives the count signal CNT[n:0] counted during a time when the differential signal comparison unit 400 outputs the second comparison signal Co2 having a high level, stores the count signal CNT[n:0] counted when the second comparison signal Co2 becomes a low level, and outputs the second digital value D2. Then, the switches SW1, SW4, SW02, SW03, and SW06 are turned off.

As described above, the column ADC unit illustrated in FIG. 7 processes the image signal and the reset signal provided from the single pixel two times during two operation periods. In the first operation period, the differential signal comparison unit 400 receives the image information and the reset information through the noninverting input terminal and the inverting input terminal, respectively, compares the image information with the reset information, and outputs the output value through the noninverting input terminal. In the second operation period, the differential signal comparison unit 400 receives the image information and the reset information through the inverting input terminal and the noninverting input terminal, respectively, compares the image information with the reset information, and outputs the output value through the inverting input terminal. The digital values corresponding to the comparison signals outputted by the two-time comparison operations are calculated, and the two digital values are combined to output the final digital value.

Therefore, the column ADC unit in accordance with the embodiment of the present invention can solve the above-described problems, that is, it can completely cancel an offset component occurring on the differential signal comparison unit, an offset component occurring due to mismatch of the two capacitors, or an offset component occurring due to mismatch of other circuits provided in the column ADC unit. Due to the offset component, the digital value of A+a is extracted in the first operation period, and the digital value of A−a is extracted in the second operation period. Thus, the originally desired digital value "A" can be obtained by combining the two digital values.

By arranging a plurality of column ADC units in accordance with the embodiment of the present invention, a digital value in which an error caused by the offset component does not occur can be extracted. Hence, a more exact image can be reproduced. Thus, signals can be processed within the preset operating margin of the CMOS image sensor, even though digital values are processed using two operation periods in order for offset cancellation. The operating margins may be different for still pictures versus videos.

Figure 9:
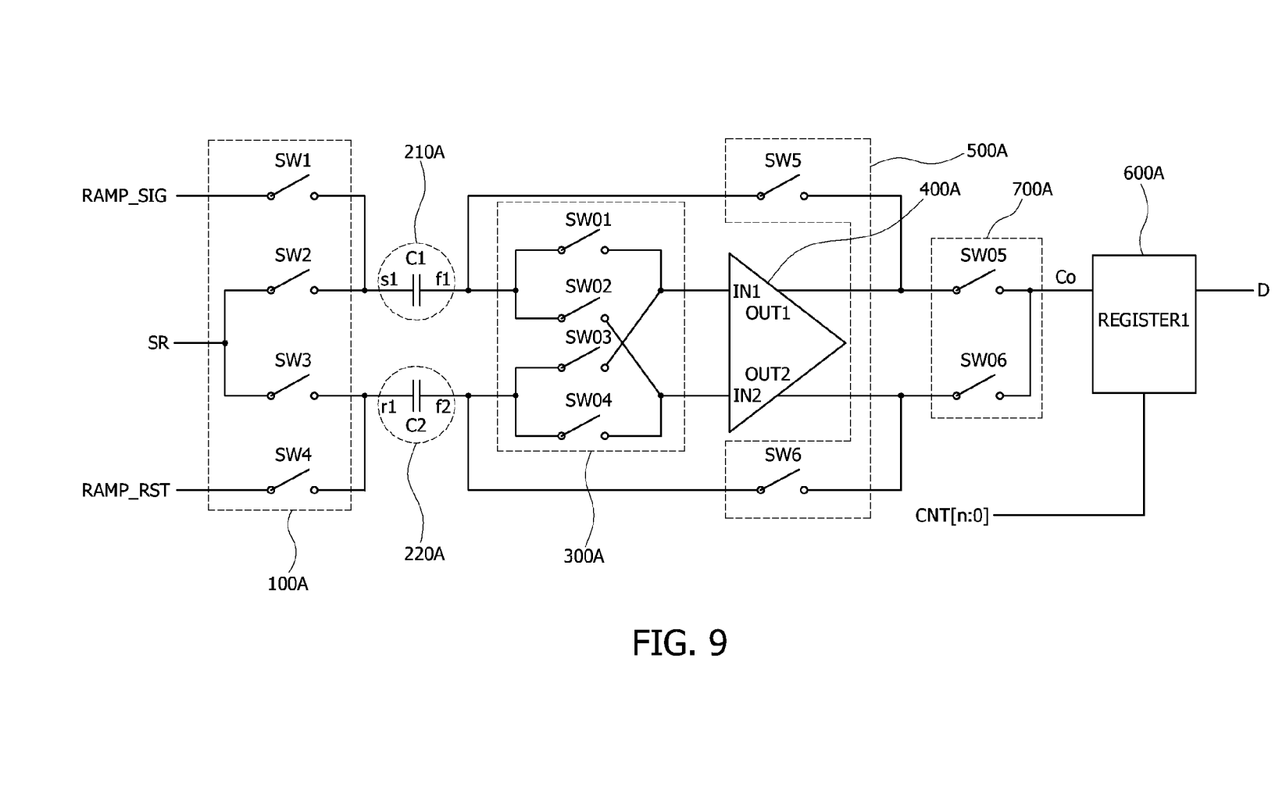
FIG. 9 is a circuit diagram of a column ADC unit in accordance with a second embodiment of the present invention.

FIG. 9 is a circuit diagram of a column ADC unit in accordance with a second embodiment of the present invention. In the second embodiment of FIG. 9, functional blocks similar to the column ADC unit of FIG. 7 are denoted by similar reference numerals.

As illustrated in FIG. 9, the column ADC unit of the CMOS image sensor in accordance with the second embodiment of the present invention includes a first switch unit 100A, a first storage unit 210A, a second storage unit 220A, a second switch unit 300A, a differential signal comparison unit 400A, a third switch unit 500A, a fourth switch unit 700A, and a digital value providing unit 600A. Since the first switch unit 100A, the first storage unit 210A, the second storage unit 220A, the second switch unit 300A, and the differential signal comparison unit 400A are substantially identical to the first switch unit 100, their detailed descriptions will not be repeated.

The column ADC unit of the CMOS image sensor in accordance with the second embodiment of the present invention is characterized in that it includes the fourth switch unit 700A and the digital value providing unit 600A.

The fourth switch unit 700A includes a switch SW05 and a switch SW06. The switch SW05 transfers the first comparison signal, which is outputted from the noninverting output terminal OUT1 of the differential signal comparison unit 400A, to the digital value providing unit 600A. The switch SW06 transfers the second comparison signal, which is outputted from the inverting output terminal OUT2 of the differential signal comparison unit 400A, to the digital value providing unit 600A. The digital value providing unit 600A starts the counting operation when the differential signal comparison unit 400A starts the comparison operation, and provides the count value, which is counted until the first or second comparison signal is generated, as the first or second digital value D.

Figure 10:
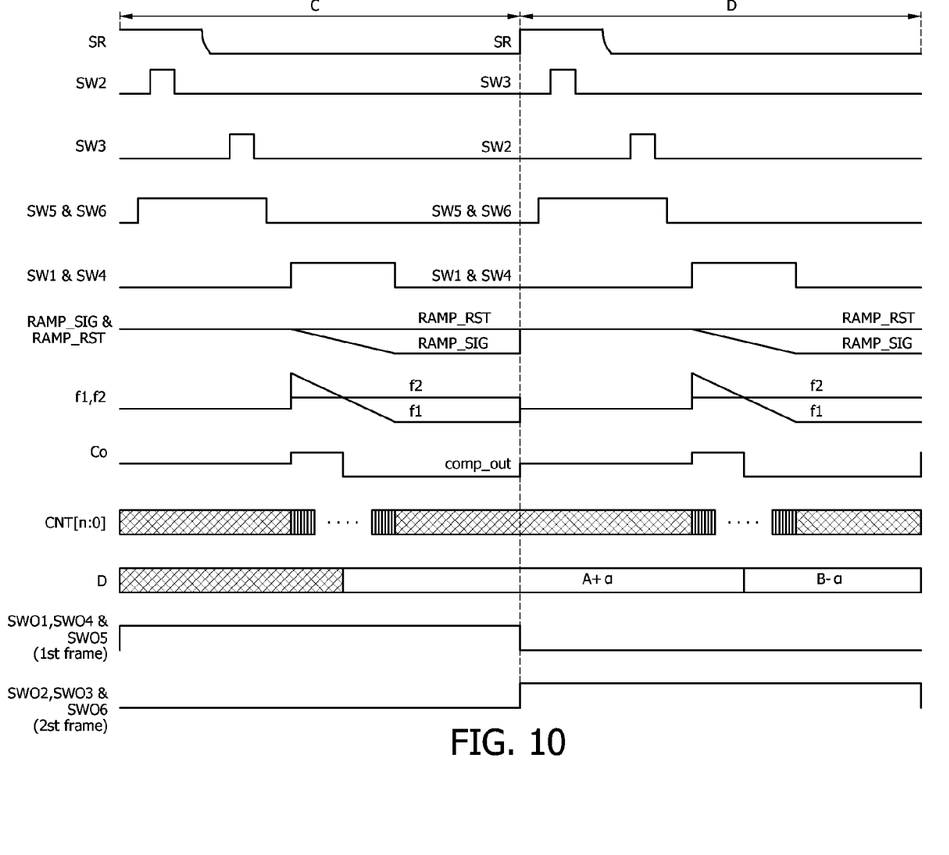
FIG. 10 is a waveform diagram explaining the operation of the ADC unit illustrated in FIG. 9.

FIG. 10 is a waveform diagram explaining the operation of the ADC unit illustrated in FIG. 9. The operation of the CMOS image sensor in accordance with the second embodiment of the present invention will be described below with reference to FIGS. 9 and 10.

The pixel sequentially provides an image signal and a corresponding reset signal to the column ADC unit. A first period C is a period where a first image signal and a first reset signal provided from the pixel are processed, and a second period D is a period where a second image signal and a second reset signal provided from the pixel are processed.

First, the operations at the first period C and the second period D are substantially identical to the operations at the period I, the period R, and the first operation period A, which have been described above with reference to FIGS. 7 and 8. During the first period C, the switches SW01, SW04, and SW05 are turned on. During the second period D, the switches SW02, SW03, and SW06 are turned on. Therefore, during the first period C, the first comparison signal is outputted from the noninverting output terminal of the differential signal comparison unit 400 through the switch SW05, and the digital value providing unit 600A stores and outputs the digital value D corresponding to the its output timing. During the second period D, the second comparison signal is outputted from the inverting output terminal of the differential signal comparison unit 400 through the switch SW06, and the digital value providing unit 600A stores and outputs the digital value D corresponding to its output timing. Thus, if the digital value D stored in the first period C has an offset component A+a, the digital value D stored in the second period D has an offset component B−a.

If these values are used to continuously process a moving picture, a user's eyes may not see an offset component while the moving picture is being processed. If an offset component "+a" is displayed on a screen once and an offset component "−a" is displayed next time, the offset of the screen is cancelled and the CFPN is removed.

When a moving picture is processed, a signal processing speed is very important and the method of FIGS. 7 and 8 may not be able to be used, depending on various conditions and signal processing speeds. However, if signals successively provided from the pixel are alternately outputted through the noninverting output terminal and the inverting output terminal of the differential signal comparison unit, and the digital values are generated in correspondence to the output timing, it is possible to prevent CFPN phenomenon from occurring due to the offset component while the moving picture is being processed.

The above description has been focused on the CMOS image sensor, but the present invention can also be applied various types of image sensors.

In accordance with the exemplary embodiments of the present invention, it is possible to solve an offset problem of a conversion unit which converts an analog value provided from a pixel of an image sensor into a digital value. Therefore, it is possible to eliminate a CFPN which is caused by an offset during the analog-to-digital conversion.

While the present invention has been described with respect to the specific embodiments, it will be apparent to those skilled in the art that various changes and modifications may be made without departing from the spirit and scope of the invention as defined in the following claims.

For example, although the case of processing the still image and the case of processing the moving picture has been separately described in the foregoing embodiments, the moving picture can be processed using the circuit block which processes the still image, and vice versa.

What is claimed is:

1. An image sensor comprising:
    a first storage unit configured to store an image information corresponding to an image signal provided from a pixel;
    a second storage unit configured to store a reset information corresponding to a reset signal provided from the pixel;
    a differential signal comparison unit configured to compare the image information and the reset information;
    a switch unit configured to transfer the image information value and the reset information value to a first input terminal and a second input terminal, respectively, of the differential signal comparison unit during a first operation period, and to transfer the image information value and the reset information value to the second input terminal and the first input terminal, respectively, during a second operation period; and
    a digital value providing unit configured to combine a first digital value generated in the first operation period, and a second digital value generated in the second operation period, and output a digital value corresponding to image information received at the pixel.

2. The image sensor of claim 1, wherein the image information is compared with the reset information, and a first comparison signal is output through a first output terminal in the first operation period and a second comparison signal is output through a second output terminal in the second operation period.

3. The image sensor of claim 2, wherein,
    during the first operation period, the digital value providing unit starts a counting operation when the differential signal comparison unit starts the comparison operation, and outputs, as the first digital value, a count value counted until the first comparison signal provided from the first output terminal of the differential signal comparison unit is generated, and
    during the second operation period, the digital value providing unit starts a counting operation when the differential signal comparison unit starts the comparison operation, and outputs, as the second digital value, a count value counted until the second comparison signal provided from the second output terminal of the differential signal comparison unit is generated.

4. The image sensor of claim 1, wherein the first storage unit comprises a first capacitor, and the second storage unit comprises a second capacitor.

5. The image sensor of claim 4, further comprising:
    a first switch configured to transfer the image signal to a second terminal of the first capacitor;
    a second switch configured to transfer the reset signal to a second terminal of the second capacitor;
    a third switch configured to transfer a first ramp signal to the second terminal of the first capacitor, wherein a level of a first terminal of the first capacitor is raised by a first preset level; and a fourth switch configured to transfer a second ramp signal to the second terminal of the second capacitor, wherein a level of a first terminal of the second capacitor is raised by a second preset level.

6. The image sensor of claim 5, further comprising:
a fifth switch configured to selectively connect the first terminal of the first capacitor to a first output terminal of the differential signal comparison unit; and
a sixth switch configured to selectively connect the first terminal of the second capacitor to a second output terminal of the differential signal comparison unit.

7. The image sensor of claim 1, wherein the switch unit comprises:
a first switch configured to transfer the image information stored in the first storage unit to the first input terminal of the differential signal comparison unit;
a second switch configured to transfer the reset information stored in the second storage unit to the first input terminal of the differential signal comparison unit;
a third switch configured to transfer the image information stored in the first storage unit to the second input terminal of the differential signal comparison unit; and
a fourth switch configured to transfer the reset information stored in the second storage unit to the second input terminal of the differential signal comparison unit.

8. The image sensor of claim 7, wherein the digital value providing unit comprises:
a fifth switch configured to transfer the first comparison signal provided from the first output terminal of the differential signal comparison unit;
a sixth switch configured to transfer the second comparison signal provided from the second output terminal of the differential signal comparison unit;
a first register unit configured to store the first digital value in response to the first comparison signal provided by the fifth switch during the first operation period;
a second register unit configured to store the second digital value in response to the second comparison signal provided by the sixth switch during the second operation period; and
a signal output unit configured to generate a mean value of the first and second digital values.

9. An image sensor comprising:
a first storage unit configured to store a first image signal and a second image signal sequentially provided from a pixel;
a second storage unit configured to store a first reset signal and a second reset signal sequentially provided from the pixel and corresponding to the first image signal and the second image signal;
a differential signal comparison unit configured to compare input signals through a first input terminal and a second input terminal, and output an output signal corresponding to a difference of the input signals through a first output terminal and a second output terminal;
a first switch unit configured to transfer a first image information and a first reset information to the first input terminal and the second input terminal of the differential signal comparison unit, respectively, and transfer a second information and a second reset information to the second input terminal and the first input terminal of the differential signal comparison unit, respectively;
a second switch unit configured to sequentially transfer a first comparison signal provided from the first output terminal of the differential signal comparison unit, and a second comparison signal provided from the second output terminal of the differential signal comparison unit; and
a digital value providing unit configured to transfer a first digital value corresponding to an output timing of the first comparison signal, and a second digital value corresponding to an output timing of the second comparison signal.

10. The image sensor of claim 9, wherein the digital value providing unit starts a counting operation when the differential signal comparison unit starts a comparison operation, and provides a count value, which is counted until the first or second comparison signal transferred by the second switch unit is generated, as the first digital value or the second digital value, respectively.

11. The image sensor of claim 9, wherein the first storage unit comprises a first capacitor, and the second storage unit comprises a second capacitor.

12. The image sensor of claim 11, further comprising:
a first switch configured to transfer the first image signal or the second image signal to the first capacitor;
a second switch configured to transfer the first reset signal or the second image signal to the second capacitor;
a third switch configured to transfer a first ramp signal to a second terminal of the first capacitor, wherein a level of a first terminal of the first capacitor is raised by a first preset level; and
a fourth switch configured to transfer a second ramp signal to a second terminal of the second capacitor, wherein a level of a first terminal of the second capacitor is raised by a second preset level.

13. The image sensor of claim 12, further comprising:
a fifth switch configured to selectively connect the first terminal of the first capacitor to the first output terminal of the differential signal comparison unit; and
a sixth switch configured to selectively connect the first terminal of the second capacitor to the second output terminal of the differential signal comparison unit.

14. The image sensor of claim 9, wherein the first switch unit comprises:
a first switch configured to transfer the first image information value stored in the first storage to the first input terminal of the differential signal comparison unit;
a second switch configured to transfer the first reset information value stored in the second storage to the first input terminal of the differential signal comparison unit;
a third switch configured to transfer the second image information value stored in the first storage unit to the second input terminal of the differential signal comparison unit; and
a fourth switch configured to transfer the second reset information value stored in the second storage unit to the second input terminal of the differential signal comparison unit.

15. The image sensor of claim 14, wherein the second switch unit comprises:
a fifth switch configured to transfer the first comparison signal from the first output terminal of the differential signal comparison unit, to the digital value providing unit; and
a sixth switch configured to transfer the second comparison signal from the second output terminal of the differential signal comparison unit, to the digital value providing unit.

16. The image sensor of claim 15, wherein the digital value providing unit comprises a register unit configured to store the first digital value in response to the first comparison signal provided by the fifth switch, and store the second digital value in response to the second comparison signal provided by the sixth switch.

17. A method for generating an image, the method comprising:
    storing an image signal value corresponding to an image signal provided from a pixel;
    storing a reset signal value corresponding to a reset signal provided from the pixel;
    receiving the image signal value and the reset signal value through a first input terminal and a second input terminal of a differential signal comparison unit, respectively, comparing the image signal value with the reset signal value, and outputting a first comparison signal through a first output terminal of the differential signal comparison unit;
    starting a counting operation at a time when the comparison is started, and outputting a count value, which is counted until the first comparison signal is generated, as a first digital value;
    receiving the image signal value and the reset signal value through the second input terminal and the first input terminal of the differential signal comparison unit, respectively, comparing the image signal value with the reset signal value, and outputting a second comparison signal through a second output terminal of the differential signal comparison unit;
    starting a counting operation at a timing when the comparison is started, and outputting a count value, which is counted until the second comparison signal is generated, as a second digital value; and
    combining the first digital value and the second digital value, and output a digital value.

18. A method for generating an image, the method comprising:
    storing a first image signal value corresponding to a first image signal provided from a pixel;
    storing a first reset signal value corresponding to a first reset signal provided from the pixel;
    receiving the first image signal value and the first reset signal value through a first input terminal and a second input terminal of a differential signal comparison unit, respectively, comparing the first image signal value with the second reset signal value, and outputting a first comparison signal through a first output terminal of the differential signal comparison unit;
    starting a counting operation at a timing when the comparison is started, and outputting a count value, which is counted until the first comparison signal is generated, as a first digital value;
    storing a second image signal value corresponding to a second image signal provided from a pixel;
    storing a second reset signal value corresponding to a second reset signal provided from the pixel;
    receiving the second image signal value and the second reset signal value through the second input terminal and the first input terminal of the differential signal comparison unit, respectively, comparing the second image signal value with the second reset signal value, and outputting a second comparison signal through a second output terminal of the differential signal comparison unit;
    starting a counting operation at a time when the comparison is started, and outputting a count value, which is counted until the second comparison signal is generated, as a second digital value; and
    combining the first digital value and the second digital value, and output a digital value.

\* \* \* \* \*